United States Patent
Memering et al.

(10) Patent No.: US 9,632,537 B2
(45) Date of Patent: Apr. 25, 2017

(54) ELECTRONIC COMPONENT EMBEDDED IN CERAMIC MATERIAL

(71) Applicant: Apple Inc., Cupertino, CA (US)

(72) Inventors: Dale N. Memering, San Francisco, CA (US); Erik G. de Jong, San Francisco, CA (US); Fletcher R. Rothkopf, Los Altos, CA (US); Samuel Weiss, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 154 days.

(21) Appl. No.: 14/033,981

(22) Filed: Sep. 23, 2013

(65) Prior Publication Data
US 2015/0085429 A1    Mar. 26, 2015

(51) Int. Cl.
| | | |
|---|---|---|
| *G06F 1/16* | (2006.01) |
| *H01Q 1/22* | (2006.01) |
| *B32B 17/06* | (2006.01) |
| *H04M 1/02* | (2006.01) |
| *H01Q 1/12* | (2006.01) |

(52) U.S. Cl.
CPC ............ *G06F 1/1637* (2013.01); *B32B 17/06* (2013.01); *G06F 1/16* (2013.01); *G06F 1/1613* (2013.01); *G06F 1/1626* (2013.01); *G06F 1/1698* (2013.01); *H01Q 1/2258* (2013.01); *H04M 1/0266* (2013.01); *H01Q 1/1271* (2013.01)

(58) Field of Classification Search
CPC .......................... H01Q 1/1271; H01Q 1/2258
USPC ...... 361/679.55, 679.56; 455/575.7; 343/873
See application file for complete search history.

(56) References Cited

U.S. PATENT DOCUMENTS

| | | | |
|---|---|---|---|
| 2,248,955 A | | 7/1941 | Capps |
| 2,854,794 A | | 10/1958 | Luedeman |
| 3,208,070 A | * | 9/1965 | Boicey .......................... 343/712 |
| 3,753,775 A | | 8/1973 | Robinson et al. |
| 3,866,232 A | * | 2/1975 | Weigt .................. H01Q 1/1271 343/701 |
| 3,964,942 A | | 6/1976 | Berkenblit et al. |
| 4,008,111 A | | 2/1977 | Rutz |
| 4,054,895 A | | 10/1977 | Ham |

(Continued)

FOREIGN PATENT DOCUMENTS

| | | |
|---|---|---|
| CN | 1400859 | 3/2003 |
| CN | 1770552 A | 5/2006 |

(Continued)

OTHER PUBLICATIONS

International Search Report and Written Opinion, PCT/US2014/056439, 11 pages, Feb. 6, 2015.

(Continued)

*Primary Examiner* — Adrian S Wilson
(74) *Attorney, Agent, or Firm* — Joseph F. Guihan

(57) ABSTRACT

A ceramic material having an electronic component embedded therein, and more particularly to a sapphire surface having an electrically energized component embedded within. In some embodiments, the sapphire surface may take the form of a portion of a housing for an electronic device. Since sapphire may be substantially transparent, it may form a cover glass for a display within or forming part of the electronic device, as one example. The cover glass may be bonded, affixed, or otherwise attached to a remainder of the housing, thereby forming an enclosure for the electronic device.

9 Claims, 8 Drawing Sheets

(56) References Cited

U.S. PATENT DOCUMENTS

| | | | |
|---|---|---|---|
| 4,070,211 A | 1/1978 | Harari | |
| 4,085,302 A | 4/1978 | Zenk et al. | |
| 4,339,300 A | 7/1982 | Noble | |
| 4,393,578 A | 7/1983 | Cady et al. | |
| 4,662,124 A | 5/1987 | Kato et al. | |
| 4,732,867 A | 3/1988 | Schnable | |
| 4,735,917 A | 4/1988 | Flatley et al. | |
| 4,775,641 A | 10/1988 | Duffy et al. | |
| 4,811,004 A | 3/1989 | Person et al. | |
| 4,826,300 A | 5/1989 | Efron et al. | |
| 4,849,299 A | 7/1989 | Loth | |
| 4,908,074 A | 3/1990 | Hosoi et al. | |
| 4,946,546 A | 8/1990 | Bourgeois-Moine | |
| 5,005,020 A * | 4/1991 | Ogawa et al. | 343/713 |
| 5,151,389 A | 9/1992 | Zappella | |
| 5,154,023 A | 10/1992 | Sioshansi | |
| 5,377,669 A | 1/1995 | Schulz | |
| 5,413,360 A | 5/1995 | Atari et al. | |
| 5,427,051 A | 6/1995 | Maxwell et al. | |
| 5,441,591 A | 8/1995 | Imthurn et al. | |
| 5,451,553 A | 9/1995 | Scott et al. | |
| 5,543,630 A | 8/1996 | Bliss et al. | |
| 5,549,746 A | 8/1996 | Scott et al. | |
| 5,627,109 A | 5/1997 | Sassa et al. | |
| 5,661,313 A | 8/1997 | Dubbelday et al. | |
| 5,697,998 A | 12/1997 | Platus et al. | |
| 5,702,654 A | 12/1997 | Chen et al. | |
| 5,792,298 A * | 8/1998 | Sauer et al. | 156/230 |
| 5,804,522 A | 9/1998 | Uegami | |
| 5,852,622 A | 12/1998 | Meissner et al. | |
| 5,877,094 A | 3/1999 | Egley et al. | |
| 6,025,060 A | 2/2000 | Meissner et al. | |
| 6,028,711 A | 2/2000 | Adachi | |
| 6,028,762 A | 2/2000 | Kamitani | |
| 6,030,849 A | 2/2000 | Hasegawa et al. | |
| 6,038,079 A | 3/2000 | Michaels | |
| 6,121,880 A * | 9/2000 | Scott | B32B 17/06 340/10.1 |
| 6,123,026 A | 9/2000 | Gottlieb | |
| 6,265,089 B1 | 7/2001 | Fatemi et al. | |
| 6,275,157 B1 * | 8/2001 | Mays et al. | 340/572.5 |
| 6,379,985 B1 | 4/2002 | Cervantes et al. | |
| 6,406,769 B1 | 6/2002 | Delabre | |
| 6,424,017 B2 | 7/2002 | Kurtz et al. | |
| 6,457,294 B1 * | 10/2002 | Virnelson | C03C 27/10 52/172 |
| 6,483,237 B2 | 11/2002 | Eastlund et al. | |
| 6,489,221 B2 | 12/2002 | Gehrke et al. | |
| 6,547,722 B1 | 4/2003 | Higuma | |
| 6,586,819 B2 | 7/2003 | Matsuoka | |
| 6,642,989 B2 | 11/2003 | Umehara et al. | |
| 6,677,906 B2 | 1/2004 | Quinn et al. | |
| 6,775,073 B2 | 8/2004 | Kamo | |
| 6,818,532 B2 | 11/2004 | Yeom et al. | |
| 6,819,693 B2 | 11/2004 | Kinoshita et al. | |
| 6,849,524 B2 | 2/2005 | Shelton et al. | |
| 6,852,253 B2 | 2/2005 | Tomioka | |
| 6,858,274 B2 | 2/2005 | Fukazawa | |
| 6,872,108 B2 | 3/2005 | Fuse et al. | |
| 6,875,099 B2 | 4/2005 | Stepanovich | |
| 6,911,375 B2 | 6/2005 | Guarini et al. | |
| 7,018,709 B2 | 3/2006 | Stevenson et al. | |
| 7,030,417 B2 | 4/2006 | Ishibashi et al. | |
| 7,074,652 B2 | 7/2006 | Yoon et al. | |
| 7,128,846 B2 | 10/2006 | Nishijima et al. | |
| 7,151,045 B2 | 12/2006 | Kim et al. | |
| 7,171,290 B2 | 1/2007 | Lagadec et al. | |
| 7,208,096 B2 | 4/2007 | Akkipeddi et al. | |
| 7,255,740 B2 | 8/2007 | Sprenger et al. | |
| 7,390,702 B2 | 6/2008 | Nakamura | |
| 7,495,615 B2 | 2/2009 | Yamanaka et al. | |
| 7,499,093 B2 | 3/2009 | Campbell | |
| 7,561,351 B2 | 7/2009 | Konno | |
| 7,616,951 B2 | 11/2009 | Chang et al. | |
| 7,619,567 B2 | 11/2009 | Lynch et al. | |
| 7,663,189 B2 | 2/2010 | Fukuda | |
| 7,683,838 B2 | 3/2010 | Koyama et al. | |
| 7,704,321 B2 | 4/2010 | Riman et al. | |
| 7,803,451 B2 | 9/2010 | Lee et al. | |
| 7,807,549 B2 | 10/2010 | Tong et al. | |
| 7,883,557 B2 | 2/2011 | Liu et al. | |
| 7,902,474 B2 | 3/2011 | Mittleman et al. | |
| 7,943,953 B2 | 5/2011 | Sakamoto et al. | |
| 7,956,356 B2 | 6/2011 | Tanikella et al. | |
| 7,966,785 B2 | 6/2011 | Zadesky et al. | |
| 7,977,587 B2 | 7/2011 | Rajagopal et al. | |
| 8,003,189 B2 | 8/2011 | Jones et al. | |
| 8,009,441 B2 | 8/2011 | Clancy et al. | |
| 8,157,912 B2 | 4/2012 | Wei | |
| 8,158,900 B2 | 4/2012 | Maatta | |
| 8,197,303 B2 | 6/2012 | Tanikella et al. | |
| 8,268,656 B2 | 9/2012 | Kajiyama | |
| 8,270,914 B2 * | 9/2012 | Pascolini | H01Q 1/243 343/702 |
| 8,350,766 B2 | 1/2013 | Hisaeda | |
| 8,390,023 B2 | 3/2013 | Armitage et al. | |
| 8,455,879 B2 | 6/2013 | Tanikella et al. | |
| 8,665,235 B2 | 3/2014 | Tang et al. | |
| 8,721,917 B2 | 5/2014 | Cherian et al. | |
| 8,866,590 B2 * | 10/2014 | Wolf | E06B 3/66309 156/60 |
| 8,922,434 B2 | 12/2014 | Prat et al. | |
| 8,971,963 B2 * | 3/2015 | Tsai | 455/562.1 |
| 2002/0017653 A1 | 2/2002 | Chuang | |
| 2002/0021250 A1 * | 2/2002 | Asano et al. | 343/702 |
| 2002/0109264 A1 * | 8/2002 | Lechner | 264/272.11 |
| 2002/0111194 A1 * | 8/2002 | Behbahani et al. | 455/566 |
| 2002/0167068 A1 | 11/2002 | Hsu et al. | |
| 2002/0168837 A1 | 11/2002 | Hsu et al. | |
| 2003/0197648 A1 * | 10/2003 | Quinn | G06F 1/1616 343/702 |
| 2006/0003587 A1 | 1/2006 | Hsu et al. | |
| 2006/0010795 A1 * | 1/2006 | Ohara | B32B 17/10036 52/204.5 |
| 2006/0043396 A1 | 3/2006 | Tsuda et al. | |
| 2006/0055619 A1 | 3/2006 | Sarabandi et al. | |
| 2006/0061512 A1 * | 3/2006 | Asano et al. | 343/702 |
| 2006/0162849 A1 | 7/2006 | Han | |
| 2006/0196849 A1 | 9/2006 | Moeggenborg et al. | |
| 2007/0204493 A1 | 9/2007 | Foley et al. | |
| 2007/0287503 A1 * | 12/2007 | Ying et al. | 455/566 |
| 2008/0036680 A1 | 2/2008 | Ito et al. | |
| 2008/0075941 A1 | 3/2008 | Tatartchenko et al. | |
| 2008/0145632 A1 | 6/2008 | Nagami | |
| 2008/0264767 A1 | 10/2008 | Chen et al. | |
| 2009/0098807 A1 | 4/2009 | Bakshi et al. | |
| 2009/0104409 A1 | 4/2009 | Derriey et al. | |
| 2009/0130415 A1 | 5/2009 | Mack, III et al. | |
| 2009/0268019 A1 | 10/2009 | Ishii | |
| 2009/0283211 A1 * | 11/2009 | Matsuhira | B29C 65/1435 156/275.7 |
| 2009/0321234 A1 | 12/2009 | Yu et al. | |
| 2010/0092728 A1 | 4/2010 | Hasegawa et al. | |
| 2010/0231466 A1 * | 9/2010 | Hisaeda | 343/713 |
| 2011/0019123 A1 | 1/2011 | Prest et al. | |
| 2011/0019354 A1 | 1/2011 | Prest et al. | |
| 2011/0062394 A1 | 3/2011 | Kumaran et al. | |
| 2011/0177300 A1 | 7/2011 | Hankey et al. | |
| 2011/0195560 A1 | 8/2011 | Gaudin et al. | |
| 2011/0223840 A1 | 9/2011 | Morinaga et al. | |
| 2012/0019419 A1 | 1/2012 | Prat et al. | |
| 2012/0038471 A1 | 2/2012 | Kim et al. | |
| 2012/0088099 A1 | 4/2012 | Tosatti et al. | |
| 2012/0118228 A1 | 5/2012 | Lee et al. | |
| 2012/0135177 A1 | 5/2012 | Cornejo et al. | |
| 2012/0212890 A1 * | 8/2012 | Hoshino | H04M 1/0202 361/679.01 |
| 2012/0229424 A1 | 9/2012 | Behles et al. | |
| 2012/0299841 A1 * | 11/2012 | Tang et al. | 345/173 |
| 2013/0082895 A1 | 4/2013 | Shiu et al. | |
| 2013/0102359 A1 | 4/2013 | Ho | |
| 2013/0237402 A1 | 9/2013 | Wang et al. | |
| 2013/0260680 A1 | 10/2013 | Tsai | |

(56) References Cited

U.S. PATENT DOCUMENTS

| | | | |
|---|---|---|---|
| 2014/0178647 A1* | 6/2014 | Kim | B44C 5/0407 |
| | | | 428/166 |
| 2015/0085429 A1 | 3/2015 | Memering et al. | |
| 2015/0085432 A1 | 3/2015 | Memering et al. | |
| 2016/0062405 A1 | 3/2016 | Mylvaganam et al. | |
| 2016/0064800 A1 | 3/2016 | de Jong et al. | |
| 2016/0087332 A1 | 3/2016 | Pope et al. | |

FOREIGN PATENT DOCUMENTS

| | | |
|---|---|---|
| CN | 1930598 | 3/2007 |
| CN | 101180765 A | 5/2008 |
| CN | 101342887 | 1/2009 |
| CN | 102437405 A | 5/2012 |
| CN | 102804106 A | 11/2012 |
| CN | 103052286 | 4/2013 |
| CN | 103096649 | 5/2013 |
| DE | 20200800251 | 6/2008 |
| EP | 0305626 | 3/1989 |
| EP | 1013802 | 6/2000 |
| EP | 1829846 | 9/2007 |
| EP | 1868263 | 12/2007 |
| EP | 2424034 | 2/2012 |
| GB | 1135886 | 12/1968 |
| GB | 2471161 | 12/2010 |
| JP | 54032062 | 3/1979 |
| JP | 1173764 | 7/1989 |
| JP | 2039578 | 2/1990 |
| JP | 3021048 | 1/1991 |
| JP | H0398948 | 4/1991 |
| JP | 03115200 | 5/1991 |
| JP | 3177335 | 8/1991 |
| JP | 3250659 | 11/1991 |
| JP | 5027257 | 2/1993 |
| JP | 5085894 | 4/1993 |
| JP | 5313103 | 11/1993 |
| JP | 5333164 | 12/1993 |
| JP | 5335435 | 12/1993 |
| JP | 06242260 | 9/1994 |
| JP | 6314694 | 11/1994 |
| JP | 06337292 | 12/1994 |
| JP | 7129952 | 5/1995 |
| JP | 07145000 | 6/1995 |
| JP | 8040797 | 2/1996 |
| JP | 8148594 | 6/1996 |
| JP | 09008690 | 1/1997 |
| JP | 9213773 | 8/1997 |
| JP | 9270565 | 10/1997 |
| JP | 9295895 | 11/1997 |
| JP | 10239520 | 9/1998 |
| JP | 10269543 | 10/1998 |
| JP | 10275955 | 10/1998 |
| JP | 10335259 | 12/1998 |
| JP | 11135889 | 5/1999 |
| JP | 2000183203 | 6/2000 |
| JP | 2000196149 | 7/2000 |
| JP | 2001134927 | 5/2001 |
| JP | 2001176993 | 6/2001 |
| JP | 2001237335 | 8/2001 |
| JP | 2001298170 | 10/2001 |
| JP | 2002015977 | 1/2002 |
| JP | 2002109854 | 4/2002 |
| JP | 2002184845 | 6/2002 |
| JP | 2002201096 | 7/2002 |
| JP | 2002255694 | 9/2002 |
| JP | 2002289529 | 10/2002 |
| JP | 2002293692 | 10/2002 |
| JP | 2003015156 | 1/2003 |
| JP | 2003069176 | 3/2003 |
| JP | 2003133802 | 5/2003 |
| JP | 2003137690 | 5/2003 |
| JP | 2003245847 | 9/2003 |
| JP | 2003277194 | 10/2003 |
| JP | 2003282551 | 10/2003 |
| JP | 2003332234 | 11/2003 |
| JP | 2004111848 | 4/2004 |
| JP | 2004168622 | 6/2004 |
| JP | 2004288550 | 10/2004 |
| JP | 2004296575 | 10/2004 |
| JP | 2004296701 | 10/2004 |
| JP | 2004296912 | 10/2004 |
| JP | 2005047718 | 2/2005 |
| JP | 2005064492 | 3/2005 |
| JP | 2005079171 | 3/2005 |
| JP | 2005085888 | 3/2005 |
| JP | 2005101230 | 4/2005 |
| JP | 2005104742 | 4/2005 |
| JP | 2005136106 | 5/2005 |
| JP | 2005277334 | 10/2005 |
| JP | 2005285869 | 10/2005 |
| JP | 2005314121 | 11/2005 |
| JP | 2006016230 | 1/2006 |
| JP | 2006016239 | 1/2006 |
| JP | 2006062931 | 3/2006 |
| JP | 2006066442 | 3/2006 |
| JP | 2006232639 | 9/2006 |
| JP | 2006232640 | 9/2006 |
| JP | 2006339308 | 12/2006 |
| JP | 2007150072 | 6/2007 |
| JP | 2007237627 | 9/2007 |
| JP | 2007237628 | 9/2007 |
| JP | 2007269577 | 10/2007 |
| JP | 2008111984 | 5/2008 |
| JP | 2008211040 | 9/2008 |
| JP | 2008297150 | 12/2008 |
| JP | 2009263534 | 11/2009 |
| JP | 2010056485 | 3/2010 |
| JP | 2011109407 A | 6/2011 |
| JP | 2012174053 A | 9/2012 |
| JP | 2013516690 A | 5/2013 |
| JP | 2014027558 A | 2/2014 |
| KR | 20100090897 | 8/2010 |
| TW | 201342246 | 10/2013 |
| WO | WO98/56575 | 12/1998 |
| WO | WO02/054718 | 7/2002 |
| WO | WO2004/059731 | 7/2004 |
| WO | WO2006/043685 | 4/2006 |
| WO | WO2007/143480 | 12/2007 |
| WO | WO2008/036888 | 3/2008 |
| WO | WO2008/122296 | 10/2008 |
| WO | WO2009/025842 | 2/2009 |
| WO | WO2009/151160 | 12/2009 |
| WO | WO2010/057842 | 2/2010 |
| WO | 2010079268 A1 | 7/2010 |

OTHER PUBLICATIONS

Sykes, Neil, "The Use of Lasers in Target Manufacture," 2010, pp. 1-24, retrieved from the internet: URL:heep://www.stfc.ac.uk/CLF/resources/PDF/events_3effw_weds_sykes.pdf.

Zahler, James, "Sapphire and GaN Substrate Materials," DOE SSL Manufacturing R&D Workshop 2012, Presentation, Apr. 14, 2012, pp. 1-19.

Flores, Marc, "Can a Case Scratch the iPhone 4's Glass and Shatter it?," Oct. 8, 2010, pp. 1-10, retrieved from the internet: URL:http://www.intomobile.com/2010/10/08/glassgate-iphone-4.

Quick, Darren, "Aston Martin teams with Mobiado for transparent touchscreen concept phone," Mar. 28, 2011, pp. 1-5, retrieved from the internet: URL:http://www-gizmag.com/cpt002-aston-martin-concept-phone/18248.

Schmid et al., "Effect of Crystal Orientation and Temperature on the Strength of Sapphire," J.Am.Ceram.Soc., 81, 1998, pp. 885-893.

* cited by examiner

ELECTRONIC COMPONENT EMBEDDED IN CERAMIC MATERIAL

TECHNICAL FIELD

Embodiments described herein relate generally to ceramic materials having an electronic component embedded therein, and more particularly to electrically active components embedded in a ceramic surface defining a portion of an outer surface of an electronic device.

BACKGROUND

Electronic devices are ubiquitous in modern society. Examples include phones, tablet computing devices, personal computers, watches, glasses, fitness meters, earpieces, and so on. One thing is generally true of all electronic devices: each generation adds more functionality (and thus circuitry) than the last. As circuitry increases, available space decreases.

Eventually, even with the ongoing miniaturization in circuitry, a limit on physical space can be reached such that no more space is available to add any more electronic components. Likewise, even if space is available, cross-talk, interference and the like between closely-packed electronic components may cause erratic operation of overall failure.

Some electronic devices include a cover glass or other relatively hard, transparent element that covers a display. The cover glass typically is not used for anything other than protection of the display and to form part of the housing, or to be affixed to the housing. Thus, the space occupied by the cover glass may be considered wasted space from the point of view of attempting to maximize electronic circuitry within a given volume for an electronic device.

Further, some electronic devices use sapphire or other hard but brittle ceramics as a cover glass. Such cover glasses may be very resistant to scratches and damage, but may be difficult to cut, polish, grind, drill or otherwise shape or process due to their very hardness.

Thus, an improved ceramic material having an electronic component embedded therein may be useful.

SUMMARY OF THE DISCLOSURE

One embodiment described herein may take the form of an electronic device, including: a housing; a cover glass affixed to the housing; and an electronic component embedded within the cover glass. The electronic device may also have a trench defined within the cover glass; the electronic component located within the trench; and a retention element occupying a remainder of the trench, thereby embedding the electronic component with the cover glass.

Another embodiment may take the form of an electronic device, comprising: a housing; a ceramic element affixed to the housing, the ceramic element defining a void; an electronic component affixed within the void; and at least one electronic circuit within the housing and in electrical communication with the electronic component.

Other embodiments will be apparent to those skilled in the art upon reading the disclosure in its entirety.

DETAILED DESCRIPTION

Embodiments discussed herein may take the form of a ceramic material having an electronic component embedded therein, and more particularly to a sapphire surface having an electrically energized component embedded within. In some embodiments, the sapphire surface may take the form of a portion of a housing for an electronic device. Since sapphire may be substantially transparent, it may form a cover glass for a display within or forming part of the electronic device, as one example. The cover glass may be bonded, affixed, or otherwise attached to a remainder of the housing, thereby forming an enclosure for the electronic device.

In some embodiments, the electronic component embedded in the ceramic material may be electrically active (e.g., powered). The electronic component may be active only at intervals or constantly, or at least constantly while the electronic device is on. As one example of an electrically active component, the electronic component may be an antenna. As another example of an electrically active component, the electronic component may be a sensor, such as a capacitive sensor. As a third example of an electrically active component, the electronic component may be a display, such as an organic light-emitting diode array. Yet a fourth example of an electronic component may be a ground or shield element, which is an example of a passive (e.g., not powered) component that may be embedded.

In embodiments where the electronic component is affected by, or vulnerable to, noise generated by other elements in the electronic device, moving the electronic component into the ceramic material may provide physical separation from these other elements and thus reduce or mitigate the effects of noise. It should be appreciated that the same is true in embodiments where the electronic component generates noise that adversely impacts the other elements in the electronic device. "Noise," as used herein, generally includes any error or fluctuation induced in the operation of an electronic component or element, including parasitic capacitances, parasitic voltages, crosstalk, and the like.

In some embodiments, a shield or ground may be embedded within the ceramic near the electronic component in order to block noise between the component and other electronics within the electronic device. For example, a shield layer may be placed directly under the electronic device within the same space formed in the ceramic.

Typically, a void space may be formed within the ceramic in order to accept the electronic component and any optional shield or ground. A variety of sample methods for forming such a void space are discussed in more detail below.

Figure 1:
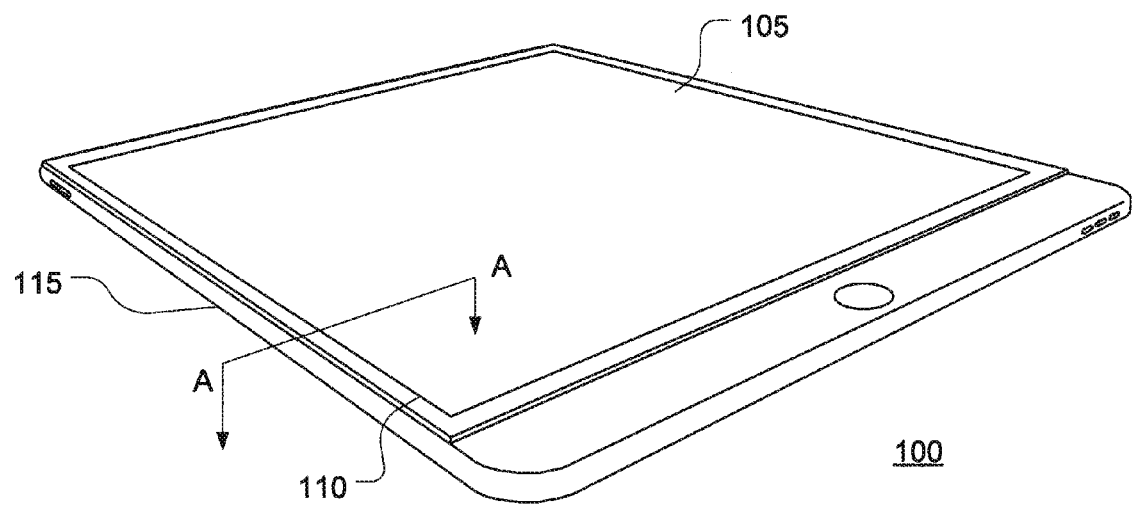
FIG. 1 depicts a perspective view of a sample electronic device having an electronic component embedded in a ceramic material.

Turning now to FIG. 1, a sample electronic device 100 incorporating a ceramic layer 105 and an electronic component 110 embedded in the ceramic layer is shown. The electronic device 100 may be, for example, a tablet device (as illustrated), a mobile phone, a portable computer, a wearable device, and so on. The ceramic layer 105 may abut a housing 115. The ceramic layer 105 may be adjacent to, bonded to and/or directly abutting the housing 115. The electronic device 100 is shown with the cover glass 105 proud of the housing 115. In alternative embodiments, the cover glass may be flush with, or recessed within, the housing. Likewise, the cover glass is shown with a flat upper surface and an angled sidewall. In other embodiments, the upper surface may be curved or otherwise arcuate rather than planar, and the arc may continue along the cover glass such that no sharp angle with any sidewall is formed.

In the illustrated embodiment, the cover glass 105 overlaying the display may be made of a transparent ceramic such as sapphire. It should be appreciated that the cover glass 105 may be fully or at least partially formed from other materials such as alumina, chemically strengthened glass, and the like. For example, a layer of alumina may be used to bond two adjacent sapphire layers to one another. Likewise, an optically clear adhesive may be used to bond adjacent sapphire layers and may form part of the cover glass. Although the term "cover glass" may be used herein, it should be appreciated that this term imposes no requirement that glass be incorporated or used in the element. For example, a cover glass may be formed entirely from sapphire, or may be formed from sapphire and alumina, sapphire and adhesive, and so forth. Likewise, although the terms "cover glass" and "ceramic layer" may be used essentially interchangeably, certain embodiments of a "ceramic layer" may be replaced with (or encompass) non-ceramics, such as glass, plastic and so on.

A sample electronic component 110 is shown embedded within the cover glass 105. The electronic element may be visible through the ceramic in certain embodiments and as shown. In alternative embodiments, the electronic element 110 may be placed beneath an ink layer or otherwise concealed so that it is not visible through the cover glass. As yet another option, the cover glass 105 may be opaque or translucent, at least in part, in order to conceal the electronic element. As still another option, the electronic element may be formed from a transparent or translucent material.

As previously mentioned, in one embodiment the electronic component 110 may include, incorporate, or be one or more antennas. For example, a first portion of the electronic component may be an antenna and a second portion may be a ground path. As yet another example, there may be multiple electronic components 110 taking the form of multiple, unconnected antennas, each of which may transmit and/or receive at a different frequency or band of frequencies. In still another embodiment, the multiple electronic antennas may be physically and/or operationally connected to one another.

Figure 2:
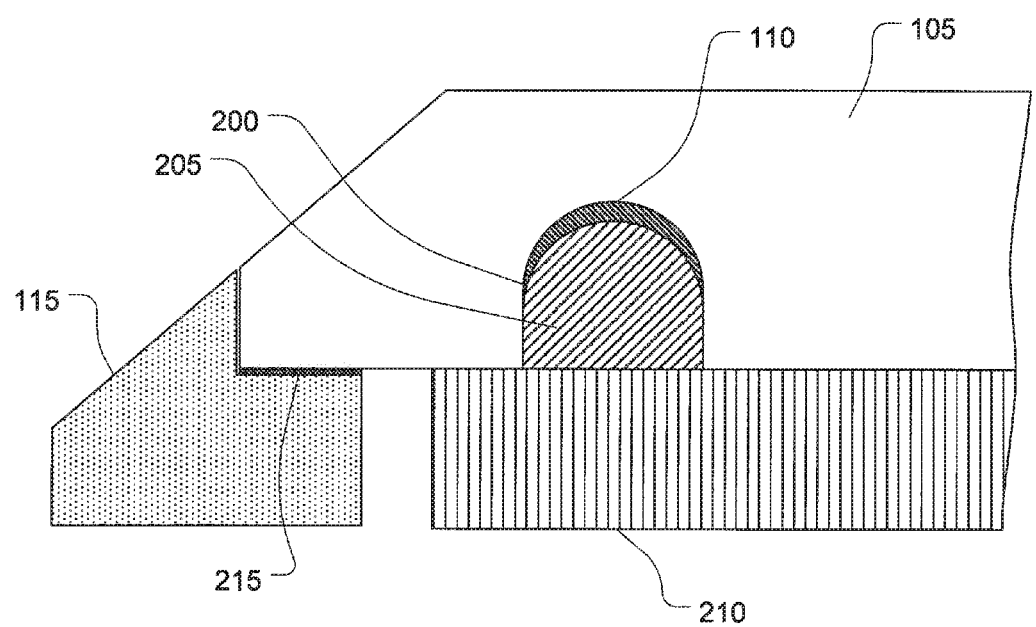
FIG. 2 is a cross-sectional view of the sample electronic device of FIG. 1, taken along line A-A of FIG. 1.

FIG. 2 depicts a first sample cross-section taken along line A-A of FIG. 1. As shown in the cross-sectional view, a trench 200 may be formed in the sapphire or other ceramic material forming the cover glass 105. The trench 200 may run about all four sides of the cover glass to form an annular groove, or may be discontinuous, such that multiple trench segments are formed as part of the overall trench.

The trench 200 may be formed through a variety of different operations. For example, the trench may be formed by computer numerical control (CNC) grinding, ultrasonic machining, laser ablation, plasma etching, laser etching (in addition to or without chemical etching), deep reactive ion etching, and so forth. In embodiments where laser ablation is used to form the trench 200, the laser may be a femtosecond laser or any other suitable laser.

The electronic component 110 may be deposited in the trench 200, filling at least a portion of the trench. The component may be pre-formed prior to deposit, or may be deposited in a liquid form and cool within the trench. Further, the electronic component 110 may extend the length of the trench 200 or may extend only partially along the trench. Likewise, as mentioned above, multiple electronic components may occupy a single trench and may be laid out without touching one another or may be laid out to at least partially overlap.

As one example, the electronic component 110 may be a conductive metal strip extending along at least a portion of the trench 200. The metal may be heated until it is a liquid and poured into the trench; upon cooling, the liquid will generally occupy the deepest part of the trench. In many embodiments, the ceramic structure 105 may be inverted from its orientation shown in FIG. 2 during addition of the electronic component 110, such that the deepest part during addition of the electronic component is the "top" of the trench with respect to the orientation shown in FIG. 2.

In addition to depositing the electronic component 110 in a solid or liquid form, the electronic component may be deposited within the trench 200 through chemical vapor deposition or any other suitable deposition method. This may permit the bottom or walls of the trench 200 to be coated with the electronic component without requiring the center of the trench to be filled, for example and as shown in FIG. 2.

After the electronic component 110 is deposited, the remainder of the trench 200 not occupied by the component may be filled. In some embodiments, less than the total remainder of the trench is filled. The filler material 205 may be sapphire, alumina, glass (which may or may not be chemically strengthened), plastic, epoxy, poly(methyl methacrylate) (PMMA), polycarbonate, or the like, and may depend on the material forming the ceramic substrate. Typically, although not necessarily, in embodiments using an optically transparent ceramic 105, the filler 205 has an index of refraction and transparency that is close or identical to that of the ceramic. By employing a filler that matches or comes close to the ceramic substrate with respect to these properties, optical aberrations in a finished enclosure may be reduced or eliminated. For example, alumina may be employed as a filler 205 in order to match the optical properties of sapphire.

As another option, a solid piece of ceramic may be used as a filler 205. The ceramic filler may have a size and shape that approximately matches the dimensions of the trench 200. This ceramic filler 205 may be bonded to the ceramic material forming the cover glass 105, for example along the sides of the trench 200 or at any other region of the trench not filled by the electronic component 110. In some embodiments, an optically clear adhesive may be used to bond the two. In other embodiments, a frit may be placed between the ceramic 105 and filler 205 and heated to bond the two. In still other embodiments, amorphous alumina or glass may be placed between the ceramic substrate and ceramic filler and heated to fuse the two together, for example at a molecular level. In some embodiments, an adhesive other than an optically clear adhesive may be employed. In yet other embodiments, an epoxy may bond the ceramic filler and the ceramic substrate. Fillers may be used with any or all embodiments discussed herein.

It should be appreciated that one or more through-holes (e.g., vias) may be formed when filling the trench 200. These vias may be formed by leaving certain portions of the trench 200 unfilled, or by removing some of the filler 205. The vias may permit electrical connection from the electronic component embedded within the trench to one or more electrical elements 210 within the housing. For example, a via may electrically connect the embedded electronic component to a power supply, a processor, a sensor, an electrical ground, and the like. These are all examples of electronic circuitry 210.

Electronic circuitry 210 may likewise or further include a display stack that is viewable through the cover glass 105. The display stack may generate graphics, text and/or other images that may be shown to a viewer of the electronic device 100. For example, the display stack may be an LCD display stack, and LED display stack, an OLED display stack, and so on. The display stack may include a number of discrete elements or layers, including color filters, polarizers, lighting elements (such as back lights and/or edge lights), a pixel layer, TFT circuitry for driving pixels, and the like. In some embodiments, the display stack may also include touch-sensitive circuitry configured to recognize a touch on the cover glass 105 or elsewhere on the housing 115 of the device 100. One example of such circuitry is a capacitive touch sensor array. In yet other embodiments, a biometric sensor (such as a capacitive fingerprint sensor) may be incorporated into the electronic circuitry, as may one or more force-sensitive sensors.

In some embodiments, multiple vias may extend through the filler in order to permit multiple electrical connections. This may be useful if there are multiple electronic components located within the trench, for example. It may also be useful if an electronic component requires more than one type of electrical connection (for example, some electronic components may require both power and an output connection).

After sealing the filler to the ceramic substrate, the resulting structure may be polished and finished. The exact method used to polish the ceramic and filler may vary with certain properties of the two, end uses of the cover glass (or other surface) formed by the combination of ceramic and filler, visibility of the back side of the ceramic and interface between ceramic and filler, and the like. For example, in embodiments where the ceramic is transparent and used as a cover glass or other visually transparent element, the interface between ceramic and filler may be smoother and/or more polished than in embodiments where the ceramic is translucent or opaque, and/or embodiments where the ceramic is not an external portion of the electronic device.

Accordingly, in certain embodiments the back surface of the ceramic (e.g., the surface of the ceramic on which the trench is formed) and/or the filler may be polished through annealing, mechanical polishing, chemical etching, aero lapping, and the like. In addition to polishing this surface of the ceramic and/or filler, certain of the foregoing techniques may likewise assist in bonding the filler to the ceramic. Annealing, as one example, may serve to at least partially bond the ceramic to the filler through its high heat of operation.

In some embodiments, an adhesive 215 may bond the cover glass 105 to the housing 115. This adhesive may prevent ingress of particles from the environment to the interior of the electronic device 100. In alternative embodiments, the adhesive 215 may be replaced with a barrier that may be affixed or adhered to either or both of the housing and cover glass. The barrier may be compressible in certain embodiments in order to provide a tight seal between the cover glass 105 and housing 115.

Figure 3A:
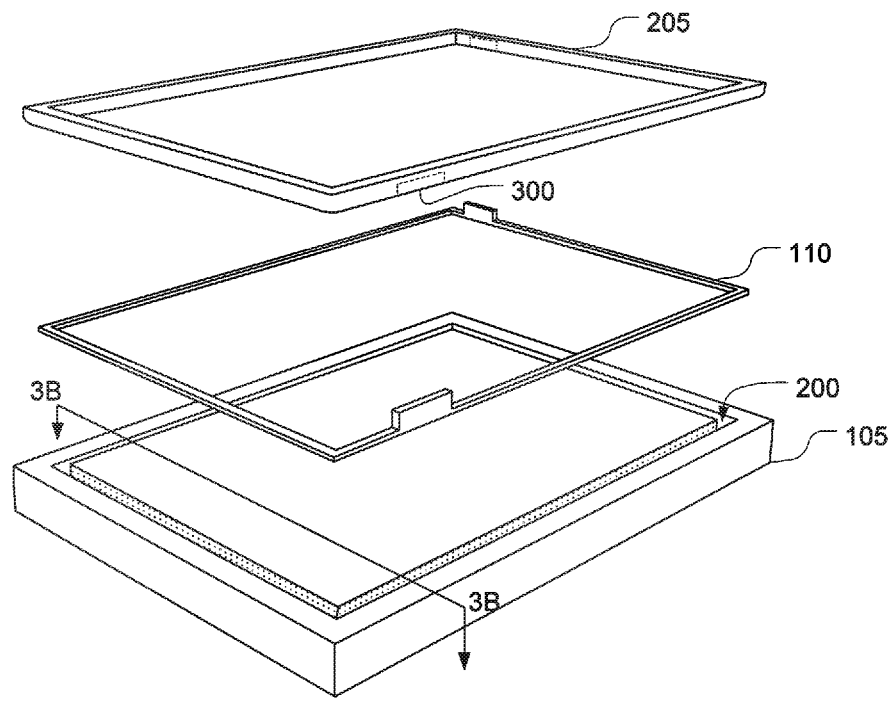
FIG. 3A is an exploded view of the cover glass structure of FIG. 2, showing the electronic component and other elements.

FIG. 3A is an exploded view of a ceramic substrate 105 (e.g., a cover glass), an electronic element 110 (such as an antenna), and a filler 205. The trench 200 is shown on the underside of the ceramic substrate, which may be an optically transparent ceramic such as sapphire.

The trench 200 is generally sized to receive the electronic element 110. Typically, the electronic component does not extend past any edge of the trench, but instead is fully contained within the trench. Although FIG. 3A depicts a single electronic component that is formed as a contiguous, unbroken rectangle, it should be appreciated that differently-shaped or configured electronic components may be employed. For example, multiple electronic components may be separated by one or more insulating spacers. Indeed, the size and shape of the electronic component 110 may vary somewhat from the size and shape of the trench 200, even though the electronic component may fit fully within the trench. In some embodiments, as discussed above, the multiple electronic components may not be physically joined to one another or a single electronic component may be placed within the trench.

The filler 205 is also shown in FIG. 3A. Although the filler is shown as a solid annular construct in FIG. 3A, it should be appreciated that it may be granular, discontinuous, or otherwise formed from multiple pieces or parts. Typically, the filler 205 bonds to the ceramic substrate 105 and retains the electronic component 110 in place in the trench 200. In some embodiments, the filler may also serve to electrically isolate or insulate the electronic component from other electronic elements within the device enclosure. Thus, the filler 205 may be chosen for its electrically insulating properties; for example, a material with a high dielectric constant may be chosen as a filler. One or more depressions or recesses 300 may be formed in the filler to accommodate one or more protrusions of the antenna, as indicated in phantom in FIG. 3A.

Figure 3B:
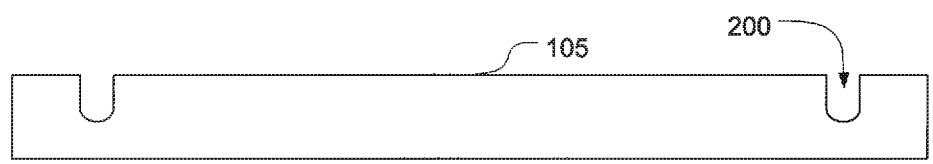
FIG. 3B is a cross-sectional view of a cover glass substrate, taken along line 3B-3B of FIG. 3A.

FIG. 3B generally is a cross-sectional view taken along line 3B-3B of FIG. 3A, showing the cross-sectional structure of the trench 200 in the ceramic substrate 105. It should be appreciated that the cross-sectional structure of the trench may vary between embodiments. For example, the trench may have a flat or angled bottom rather than a curved bottom.

Figure 4:
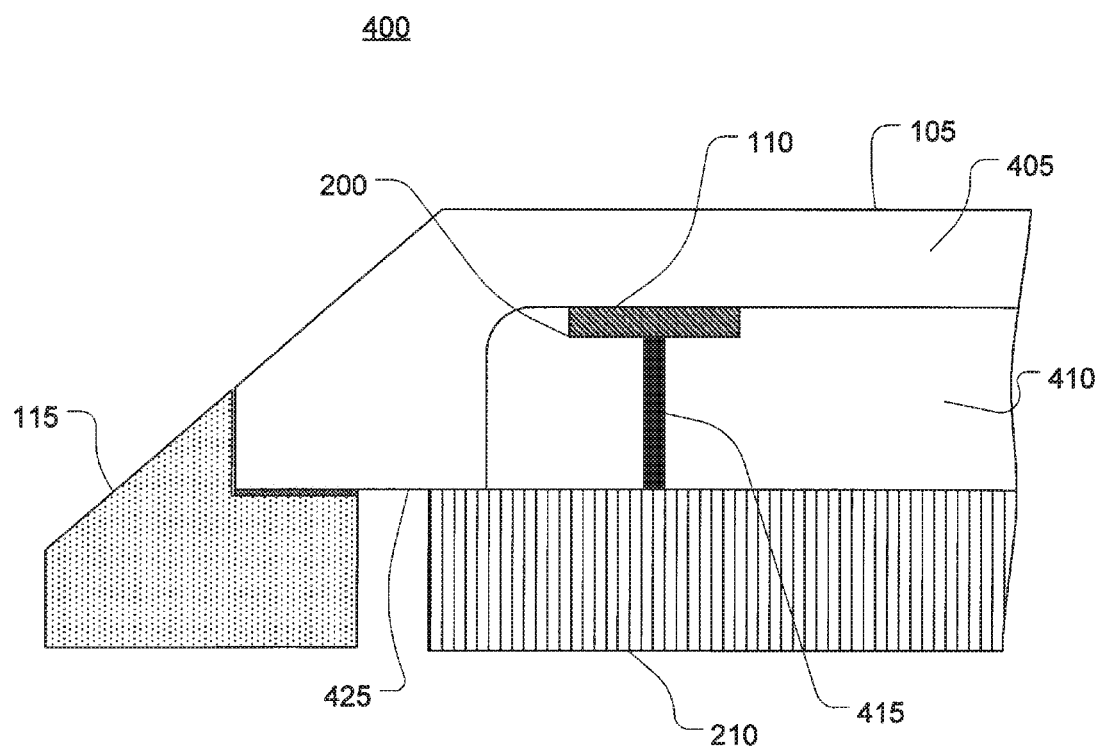
FIG. 4 is a cross-sectional view of another sample electronic device having an electronic component embedded in a ceramic material, similar to the view of FIG. 2.

FIG. 4 depicts a cross-sectional view of another embodiment 400, again taken along line A-A of FIG. 1. FIG. 4 generally depicts a cross-section of a cover glass 105 formed from multiple laminated layers of sapphire 405, 410, or another suitable cover glass material. A receptacle, such as a trench 200, may be formed in one of the sapphire layers and may hold the antenna or antennas.

In the embodiment shown in FIG. 4, the cover glass 105 may be formed from first 405 and second 410 cover glass layers that are bonded together. The first, outer layer 405 may have a depression 420 formed in its inner surface that is sized to accept the second, inner cover glass layer (see, for example, FIG. 5B). Thus, the outer layer 405 may be somewhat similar to a bucket—it may have a raised ledge or lip 425 running along its periphery, with the raised ledge extending inwardly into the outer layer. The raised ledge 425 may abut a base 430 of the depression 420, thus forming a wall or walls around the depression. In some embodiments, the ledge may be formed by multiple sidewalls abutting one another. The sidewalls may meet at a sharp angle, such as a right angle, or may curved transitions may be formed between the sidewalls and connect the sidewalls. Likewise, the transition from the sidewall(s) to the base may be curved, sharp, angled, or the like.

The second, inner cover glass layer 410 may be sized to fit within, and substantially fill, the depression 420 in the outer cover glass layer 405. Accordingly, the shape of the inner cover glass layer may be at least partially dictated by the shape of the depression 420 in the outer cover glass layer. In some embodiments, however, a spacer, filler or the like may be placed between the inner and outer cover glass layers.

Generally, a trough or groove 200 (e.g., a trench) may be formed in an upper surface of the inner cover glass layer 410, as shown in FIG. 4. The antenna or other electronic component 110 may be formed in or placed in this groove prior to sealing the outer and inner cover glass layer. In such an embodiment, it may be relatively simple to place or form the antenna 110 within the embodiment 400, since the upper surface of the inner cover glass layer 405 is exposed prior to bonding together the inner and outer cover glass layers. The antenna may be solid and placed within the trough 200, may be deposited in vapor or particulate form into the trough, may be poured as a liquid into the trough (after which it may cool to form a solid), and so on. The antenna, when placed, may occupy the entirety of the trough in some embodiments, although in other embodiments the antenna may occupy only a portion of the trough. The occupied portion may be only a segment of the length of the trough, or may be a partial depth of the trough, or both.

It should be appreciated that the relative thicknesses of the outer and inner cover glass layers 405, 410 may vary from embodiment to embodiment. They need not be the same thickness at any point or along any cross-section.

Likewise, the exact location of the trough 200 may vary. It may be formed at any point along the inner cover glass layer 405 and may (or may not) extend fully around a perimeter of the cover glass layer 410. The distance between an edge of the inner cover glass layer and the edge of the trough may vary as necessary or desired and need not be constant. Further, in some embodiments the trough 200 may be formed in the depression 420 of the outer cover glass layer 405 rather than in the inner cover glass layer 410.

As discussed with respect to previous embodiments, the inner and outer cover glass layers 405, 410 may be bonded to one another with a chemical or mechanical bond, or any other suitable adhesive bond employing any suitable material including alumina, an adhesive (such as an optically clear adhesive), and the like.

As shown in FIG. 4, one or more vias 415 may connect the antenna or other electronic component 110 to the electronic circuitry 210 of the electronic device 400. The vias 415 may be formed in the cover glass layer 410 in any of a number of fashions and may be filled with any suitable conductive material, including metal, ceramic, composites, and the like.

The size and/or shape of the vias 415 may vary not only from embodiment to embodiment, but also between vias of the same embodiment. Certain vias may be lozenge-shaped while others are round, for example. The via-filling material may be overmolded or overfill the via in some embodiments. Likewise, an end of the via 415 may be larger than a middle portion of the via to provide a larger contact surface to either the antenna or the electronic circuitry 210. Thus, the cross-section of the via may vary along its length in some embodiments.

It should be appreciated that the vias 415 may be formed by a similar or identical process as used to form the antenna 110, for example physical vapor deposition. The vias may be formed in a separate deposition process, for example after the antenna is formed and after the inner and outer cover glass layers 405, 410 are bonded to one another. As another example, the vias 415 may be flooded with a liquid metal, which may then dry to fill the vias and form electrical connections to the antenna(s).

Figure 5A:
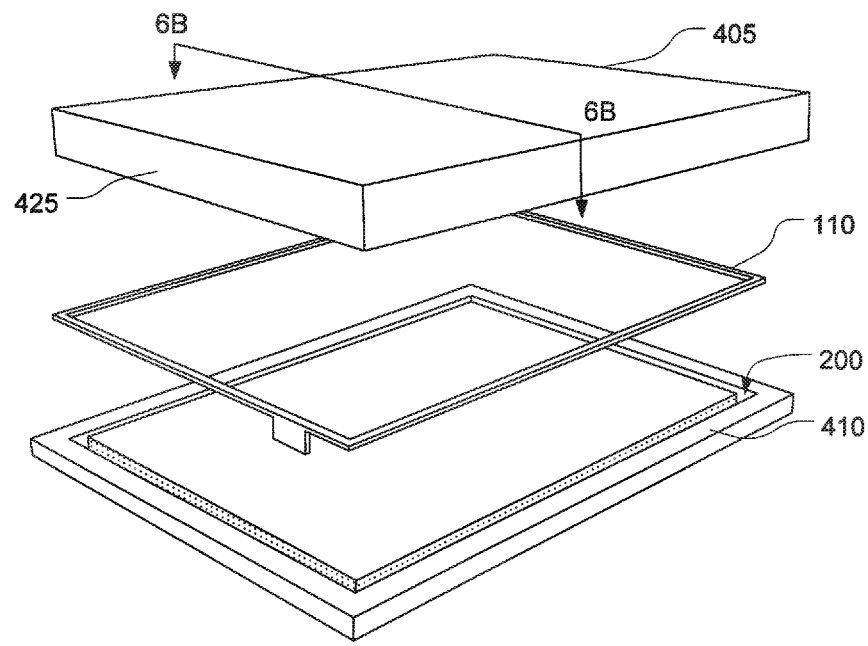
FIG. 5A is an exploded view of the cover glass structure of FIG. 4, showing the electronic component and other elements.

FIG. 5A generally shows an exploded view of the outer cover glass layer 405, the antenna 110, and the inner cover glass layer 410. Although not shown in FIG. 4, one or more holes may be formed in the outer cover glass layer to accept one or more protrusions of the antenna. In embodiments where the protrusions (if any) project downward, such holes may be formed in the inner cover glass layer 410 and may be formed as deeper sections of the trough 200.

Figure 5B:
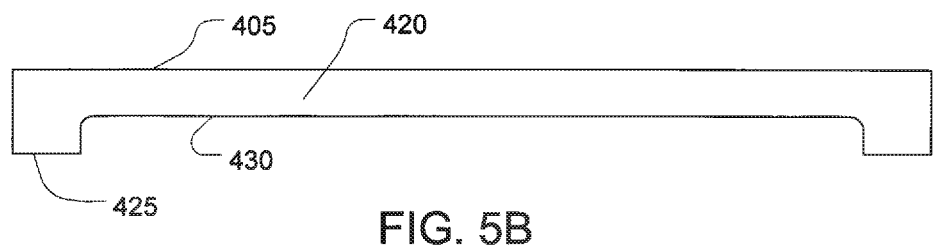
FIG. 5B is a cross-sectional view of another sample cover glass substrate, taken along line 5B-5B of FIG. 5A.

The cross-sectional shape of the outer cover glass layer 405 is shown to best effect in FIG. 5B, which is a cross-sectional view taken along line 6B-6B of FIG. 5A. FIG. 5B illustrates the "bucket" shape of the depression 420 as formed by the sidewalls 425 and base 430.

Figure 6:
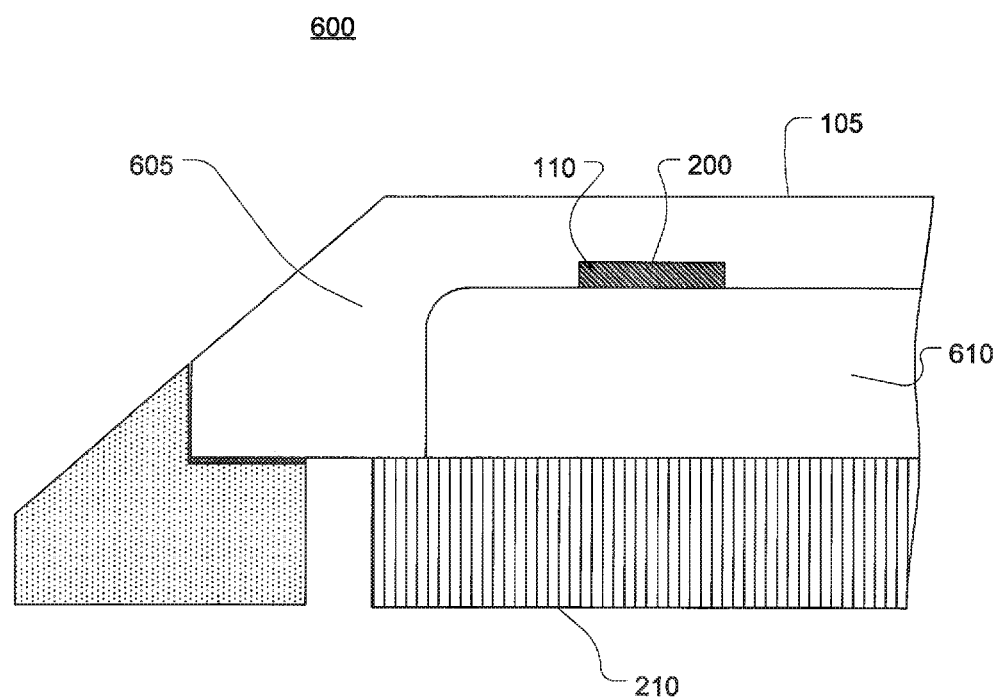
FIG. 6 is a cross-sectional view of a third sample electronic device having an electronic component embedded in a ceramic material, similar to the view of FIG. 2.

FIG. 6 shows another embodiment 600 of an electronic device having an electronic component 110 embedded in a cover glass 105. As previously discussed, the cover glass may be formed from a ceramic, one example of which is sapphire.

FIG. 6 is generally similar to FIG. 4 except that the trough 200 containing the antenna 110 is formed in the outer cover glass layer 605. Although no via is shown in FIG. 6, vias may extend through the inner cover glass layer 610 from the electronic circuitry 210 to the antenna 110. Placing the via closer to an exterior surface of the cover glass 105 and further from the electronic circuitry 210 may improve operation of the antenna and may prevent or reduce cross-talk and/or other interference between the antenna and the electronic circuitry.

Figure 7:
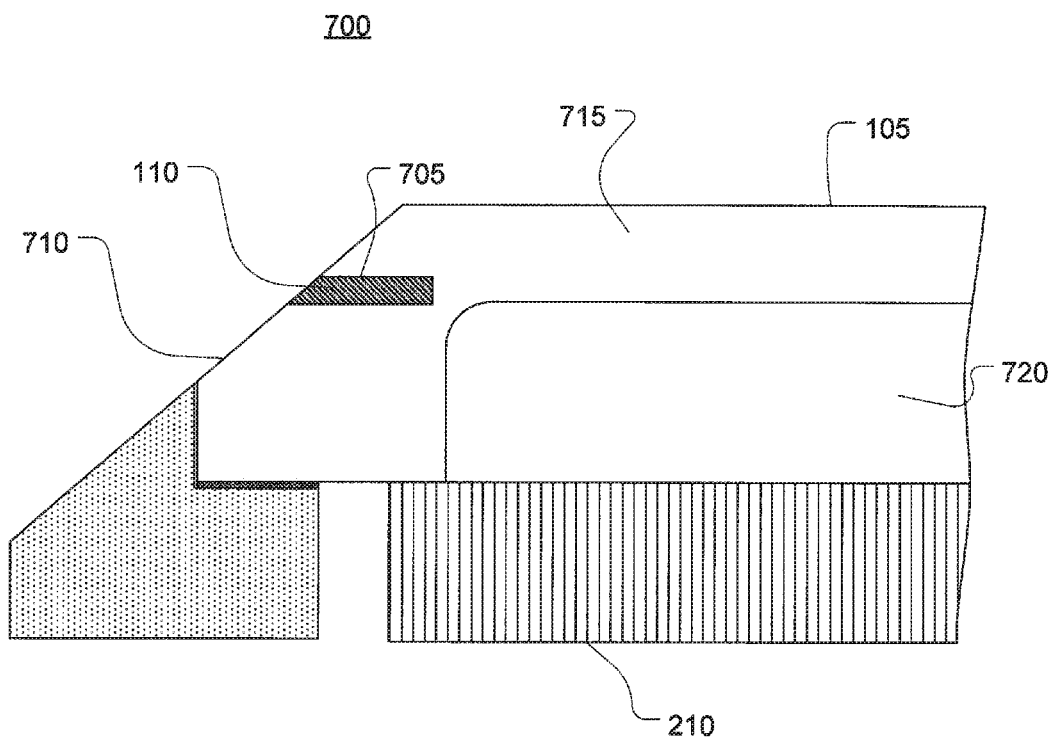
FIG. 7 is a cross-sectional view of a fourth sample electronic device having an electronic component embedded in a ceramic material, similar to the view of FIG. 2.

FIG. 7 depicts a cross-sectional view similar to those of FIGS. 4 and 6, showing yet another embodiment 700 having an antenna 110 embedded in a ceramic material. In this embodiment, the antenna may be formed or placed within a slot or groove 705 that runs about an exterior edge 710 of the cover glass 105. Thus, at least a portion of the antenna 110 may be flush with an edge 710 of the cover glass 105. In some embodiments, the antenna edge may be exposed to the environment while in other a coating may be applied over the antenna's edge and, optionally, at least part of the edge of the cover glass and/or housing to provide shielding from environmental effects and hazards.

In the embodiment of FIG. 7, the groove/slot 705 may be formed at any time, such as before or after the inner and outer ceramic layers 715, 720 are affixed to one another. Some embodiments may use a single sheet of ceramic rather than the inner and outer layers depicted in FIG. 7.

Figure 8:
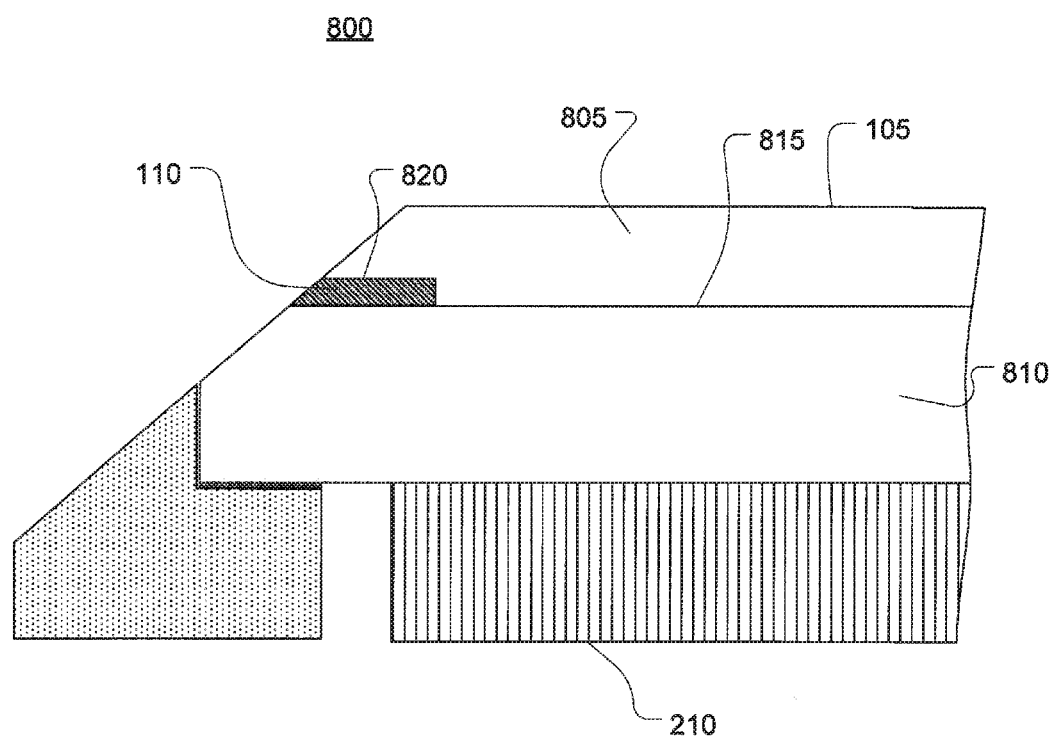
FIG. 8 is a cross-sectional view of a fifth sample electronic device having an electronic component embedded in a ceramic material, similar to the view of FIG. 2.

FIG. 8 is another cross-sectional view of an embodiment 800 similar to that of FIG. 7. Here, however, the cover glass 105 is split into upper and lower cover glass layers 805, 810. The layers are not nested together as is the case in the embodiments shown in FIGS. 4 and 6. Rather, the layers form the upper and lower portions of the cover glass and sit adjacent to one another with an interface 815 defining the point of contact. The interface 815 may be planar, such that the opposing sides of the upper and lower cover glass layers are flat. As with other embodiments, the layers may be bonded to one another, for example with an optically clear adhesive.

The slot 820 for the antenna 110 may be formed in either of the upper and lower cover glass layers 805, 810 or may be partially in both layers, although the slot is shown in FIG. 7 in the upper cover glass layer. Likewise, the slot 820 need not necessarily be formed in either layer adjacent the interface 815 between the layers. It may be more convenient and/or simpler to create the slot at the interface, however, since the slot may then be formed in an exposed surface of at least one of the cover glass layers prior to bonding the two together. Again, one or more vias may extend through the lower cover glass layer 810 and connect the antenna to the electronic circuitry 210.

In some embodiments, one or more ink layers may be deposited beneath at least a portion of the cover glass to provide decoration and/or to mask the presence of the antenna. The region of the cover glass beneath the antenna may be colored to obscure the antenna, for example. Such ink layers are purely optional. In embodiments having one or more ink coatings, the ink may be selectively deposited so as to not cover the vias, thereby permitting electrical connections between the antenna(s) and the electronic circuitry through the vias.

Some embodiments may have a trench or passage formed entirely within a cover glass. For example, a laser may be used to selectively excite ceramic molecules at a certain depth beneath the surface of the cover glass. These excited molecules may vaporize while the molecules surrounding them may remain relatively stable and unaffected. Thus, a void may be formed in the interior of the cover glass without requiring any through-holes to be formed or any chemicals to be used. Vias may later be formed to connect to the void; these vias may permit the antenna material to be deposited within the void as necessary. The vias may then be filled or sealed with an appropriate material. Similarly, the laser may be selectively applied to the sapphire lattice at a depth within cover glass to weaken the bonds between molecules. These molecules with weakened bonds may then be more easily etched with a chemical etchant to form a passage or path through the sapphire, into which an antenna or other electronic component may be deposited. Vias may be formed in the same fashion and, optionally, in conjunction with forming the internal trench.

In yet other embodiments, a shield may be placed between the electronic component and the electronic circuitry. For example, just as one or more ink layers may be deposited on the underside of the cover glass or otherwise between the cover glass and electronic circuitry, a shield may likewise be placed therebetween. The shield may insulate the electronic component in the cover glass from noise, parasitic capacitances and other undesirable electrical effects caused by proximity to the electronic circuitry and vice versa. In some embodiments, the shield may be a ground plane. Further, in embodiments employing a shield, the ink (if used) may be deposited on the shield itself and the shield may additionally provide structural support to the cover glass.

Although various embodiments have been described herein, it should be appreciated that variants and changes will be apparent to those of skill in the art upon reading the disclosure. Accordingly, the proper scope of protection is set forth in the following claims.

We claim:

1. An electronic device, comprising:
a housing;
a cover glass affixed to the housing;
a trench formed into a surface of the cover glass;
an electronic component disposed within a portion of the trench; and
a retention element that occupies a remainder of the trench, wherein the electronic component is interposed between the retention element and the cover glass and wherein the retention element is formed from sapphire.

2. The electronic device of claim 1, wherein the cover glass is formed from sapphire.

3. The electronic device of claim 2, wherein the retention element is molecularly bonded to the cover glass.

4. An electronic device, comprising:
a housing;
a cover glass affixed to the housing;
a trench formed into a surface of the cover glass;
an electronic component disposed within a portion of the trench; and
a retention element that occupies a remainder of the trench, wherein the electronic component is interposed between the retention element and the cover glass and wherein the retention element is a frit that is fused to the cover glass after deposition in the trench.

5. The electronic device of claim 1, further comprising:
at least one electronic circuit;
at least one via in electrical communication with the electronic circuit and the electronic component, the via defining an electrical connection between the electronic circuit and the electronic component.

6. The electronic device of claim 5, wherein the via extends through a portion of the cover glass.

7. The electronic device of claim 1, further comprising a display stack operative to display at least one image through the cover glass.

8. An electronic device, comprising:
a housing;
a display in the housing;
a transparent element that covers the display and is affixed to the housing, wherein the transparent element has first and second opposing surfaces, wherein the first surface of the transparent element forms an exterior surface of the electronic device, wherein a trench is formed in the second surface of the transparent element;
an electronic component, wherein at least a portion of the electronic component is formed in the trench;
ink that is formed on the second surface of the transparent element in the trench, wherein the ink is interposed between the second surface of the transparent element and the electronic component; and
at least one electronic circuit within the housing, wherein the at last one electronic circuit is in electrical communication with the electronic component.

9. The electronic device defined in claim 8, wherein the transparent element is formed from sapphire.

* * * * *